United States Patent
Umeda et al.

(10) Patent No.: US 8,351,403 B2
(45) Date of Patent: Jan. 8, 2013

(54) DATA ALLOCATION METHOD IN WIRELESS COMMUNICATION SYSTEM AND WIRELESS COMMUNICATION SYSTEM

(75) Inventors: Masataka Umeda, Kawasaki (JP); Hideki Furudate, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 12/540,228

(22) Filed: Aug. 12, 2009

(65) Prior Publication Data
US 2009/0296651 A1    Dec. 3, 2009

Related U.S. Application Data

(63) Continuation of application No. PCT/JP2007/000166, filed on Mar. 2, 2007.

(51) Int. Cl.
H04B 7/216    (2006.01)
(52) U.S. Cl. .................... 370/335; 370/203; 370/252
(58) Field of Classification Search ............... None
See application file for complete search history.

(56) References Cited

U.S. PATENT DOCUMENTS

| | | | |
|---|---|---|---|
| 6,701,127 B1 * | 3/2004 | Wreschner et al. | 455/13.2 |
| 6,870,826 B1 | 3/2005 | Ishizu | |
| 2003/0137957 A1 | 7/2003 | Kakura et al. | |
| 2003/0185179 A1 * | 10/2003 | Inogai et al. | 370/335 |

FOREIGN PATENT DOCUMENTS

| | | |
|---|---|---|
| EP | 1705818 | 9/2006 |
| JP | 2000332724 | 11/2000 |
| JP | 2002252619 | 9/2002 |
| JP | 2003046474 | 2/2003 |
| JP | 2003218778 | 7/2003 |
| JP | 2005167401 | 6/2005 |
| JP | 2005244958 | 9/2005 |
| JP | 2006054745 | 2/2006 |

OTHER PUBLICATIONS

International Search Report dated May 22, 2007.

* cited by examiner

*Primary Examiner* — Kibrom T Hailu
*Assistant Examiner* — Dady Chery
(74) *Attorney, Agent, or Firm* — Murphy & King, P.C.

(57) ABSTRACT

A data allocation method in a wireless communication system in which data is allocated in both a time axis direction and frequency axis direction, and data is transmitted between a mobile station and base station according to an allocated schedule, the allocation method including: measuring propagation path information between the mobile station and the base station; and modifying an allocation width of a burst in the time axis direction or in the frequency axis direction based on the propagation path information.

12 Claims, 8 Drawing Sheets

WHEN PROPAGATION PATH TIME
CHANGE IS FAST, FREQUENCY
DIRECTION NOTCH WIDTH IS WIDE

(A)    (B)

LENGTHEN BURST SIZE
IN TIME DIRECTION (C)

WHEN PROPAGATION PATH TIME
CHANGE IS SLOW, FREQUENCY
DIRECTION NOTCH WIDTH IS NARROW

(D)    (E)

LENGTHEN BURST SIZE
IN SUBCHANNEL
DIRECTION (F)

DATA ALLOCATION METHOD IN WIRELESS COMMUNICATION SYSTEM AND WIRELESS COMMUNICATION SYSTEM

CROSS-REFERENCE TO RELATED APPLICATIONS

This application is a continuation of international application PCT/JP2007/000166, filed on Mar. 2, 2007.

FIELD

The embodiment(s) discussed herein is (are) related to a data allocation method in a wireless communication system, and to a wireless communication system.

BACKGROUND

In a wireless communication system, there is an OFDMA (Orthogonal Frequency Division Multiple Access) system or OFDM (Orthogonal Frequency Division Multiplexing) system, in which data is mapped to subcarrier signal (carrier wave) which is mutually orthogonal on the frequency axis, and these signals are multiplexed and transmitted in order to improve throughput.

On the other hand, burst error, in which there is a continuous series of error bit in transmitted data, is one major cause of throughput degradation in the wireless communication system. A major cause of the burst error is local declines in amplitude (declines in power) on the transmission path. In particular, when a change in the transmission path is slow, the decline in amplitude in the transmission path continues for long duration in the time direction, and a probability of occurrence of the burst error rises.

In the prior art, packet communication devices is disclosed in which, when reallocating a plurality of channels to a plurality of terminals in response to the burst error, the number of channels which can be transmitted to each terminal and the number of terminals to which each channel can be allocated are combined, so as to allocate the optimal frequency to each terminal (see for example Patent Document 1 (Japanese Laid-open Patent Publication No. 2002-252619)).

Moreover, a transmission and reception device and transmission and reception method are disclosed in which the propagation path state is judged over the entire range of frequencies used by received multicarrier signal, a subband (frequency band) with satisfactory propagation path state is selected by a propagation path judgment unit, an optimal frequency region is identified, and system throughput is improved (see for example Patent Document 2 (Japanese Laid-open Patent Publication No. 2005-244958)).

In addition, there is an adaptive modulation and coding (AMC) in which an encoding and modulation method are changed adaptively on the basis of propagation path state.

However, in Patent Document 1 and Patent Document 2, the burst is not allocated to the frequency band for which the propagation path state is not good, so that the frequency band is not used, and as a result the throughput declines.

Also, in adaptive modulation encoding, the throughput of the communication system declines if a low coding rate and modulation method are selected, whereas a high SNR is preferably to transmit data if a high coding rate and modulation method are selected.

SUMMARY

According to an aspect of the invention, a data allocation method in a wireless communication system in which data is allocated in both a time axis direction and frequency axis direction, and data is transmitted between a mobile station and base station according to an allocated schedule, the allocation method including: measuring propagation path information between the mobile station and the base station; and modifying an allocation width of a burst in the time axis direction or in the frequency axis direction based on the propagation path information.

According to another aspect of the invention, A wireless communication system, including: a mobile station; and a base station, wherein data is allocated in both a time axis direction and frequency axis direction, and data is transmitted between the mobile station and base station according to an allocated schedule; the mobile station or the base station includes a propagation path measurement unit which measures propagation path information between the mobile station and base station, and a transmission unit which transmits the propagation path information to the base station or to the mobile station respectively; and the base station or the mobile station includes a mapping control unit which modifies an allocation width of a burst in the time axis direction or the frequency axis direction on the basis of the propagation path information.

According to another aspect of the invention, a wireless communication system, including: a mobile station; and a base station, wherein data is allocated in both a time axis direction and a frequency axis direction, and data is transmitted between the mobile station and base station according to an allocated schedule; the mobile station or the base station includes a propagation path measurement unit which measures propagation path information between the mobile station and base station, and a mapping control unit which modifies an allocation width of a burst in the time axis direction or the frequency axis direction based on the propagation path information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained.

Embodiment 1

Figure 1:
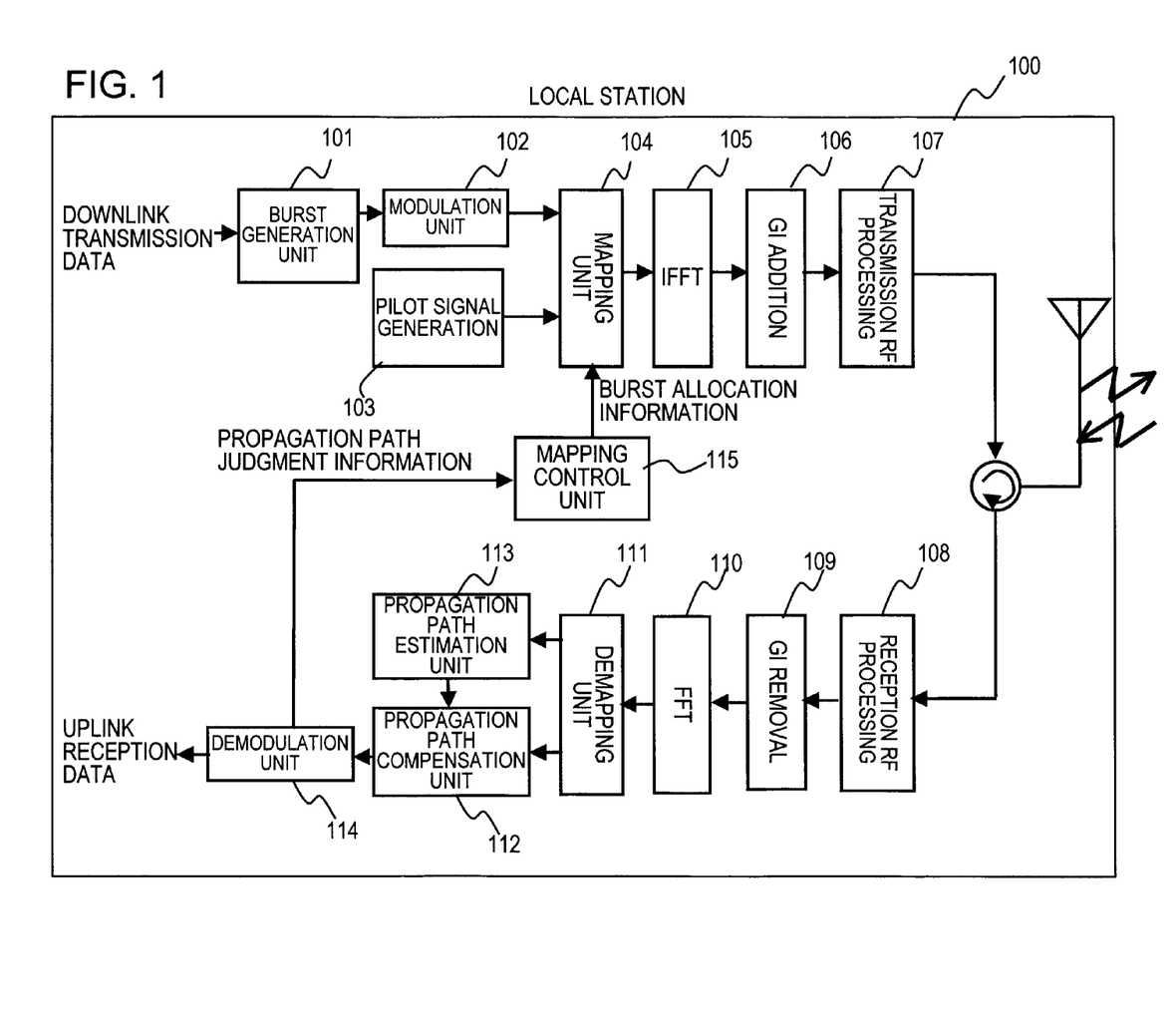
FIG. 1 depicts an example of the configuration of a local station.
Figure 2:
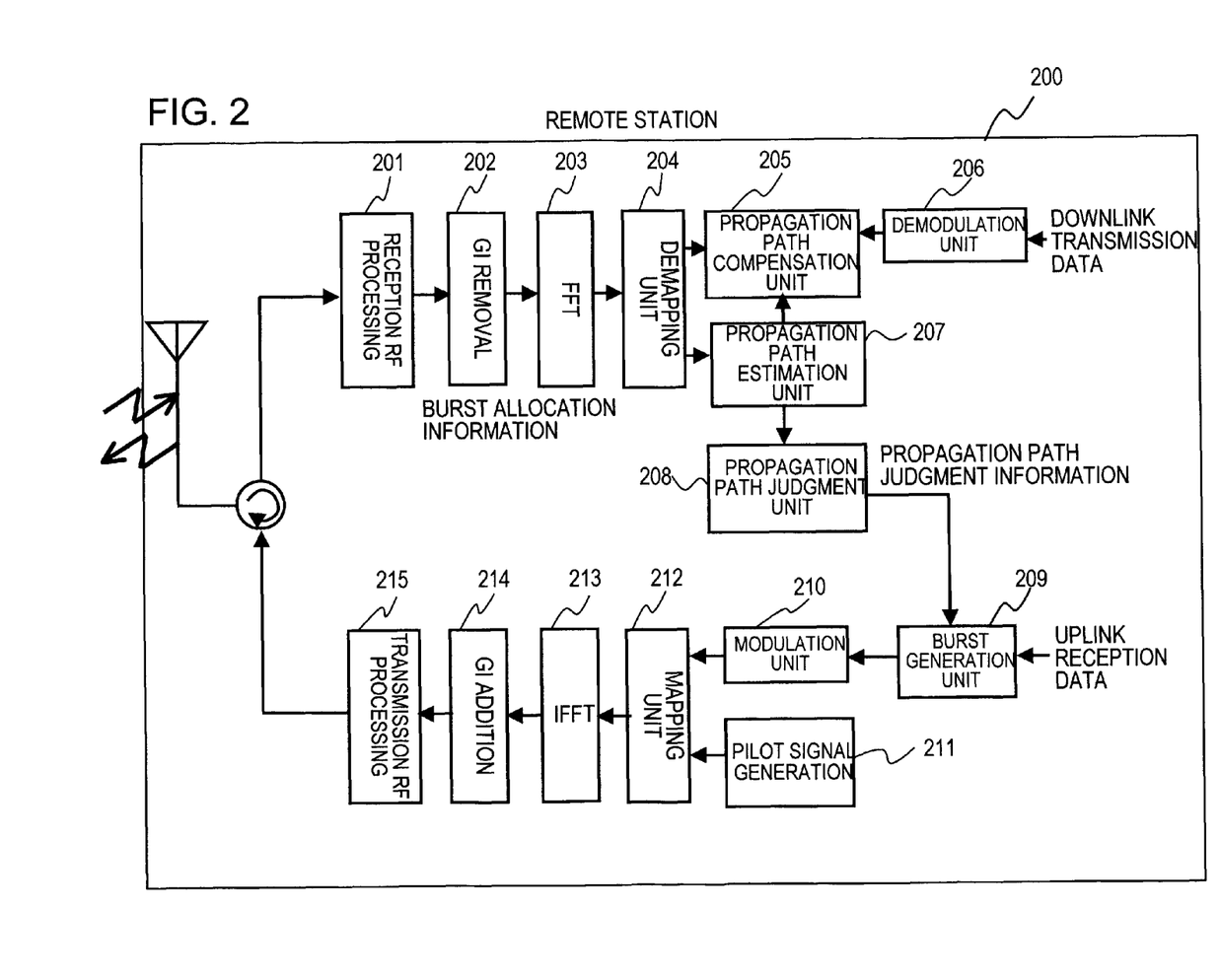
FIG. 2 depicts an example of the configuration of a remote station.

FIG. 1 and FIG. 2 depict examples of a configuration of a wireless communication system of the present Embodiment 1. FIG. 1 and FIG. 2 depict configuration examples of a local station 100 and a remote station 200 respectively. In the examples described below, the local station 100 is taken to be a wireless base station (hereafter "base station"), and the remote station 200 is taken to be a mobile station.

As depicted in FIG. 1, the base station 100 includes a burst generation unit 101; modulation unit 102; pilot signal generation unit 103; mapping unit 104; IFFT (Inverse Fast Fourier Transform) 105; GI (Guard Interval) addition unit 106; transmission RF (Radio Frequency) processing unit 107; reception RF processing unit 108; GI removal unit 109; FFT unit 110; demapping unit 111; propagation path compensation unit 112; propagation path estimation unit 113; demodulation unit 114; and mapping control unit 115.

On the other hand, as depicted in FIG. 2, the mobile station 200 includes a reception RF processing unit 201; GI removal unit 202; FFT unit 203; demapping unit 204; propagation path compensation unit 205; demodulation unit 206; propagation path estimation unit 207; propagation path judgment unit 208; burst generation unit 209; modulation unit 210; pilot signal generation unit 211; mapping unit 212; IFFT unit 213; GI addition unit 214; and transmission RF processing unit 215.

An explanation is given in order beginning with the mobile station 200. The reception RF processing unit 201 of the mobile station 200 inputs base band signal transmitted from the base station via a reception antenna, and performs a prescribed RF processing. The GI removal unit 202 removes guard interval from the received signal after RF processing, and the FFT unit 203 performs a fast Fourier transform of the received signal with guard interval removed, and outputs N subcarrier signals.

The demapping unit 204 separates data signal and pilot signal from each of the subcarrier signals, and outputs the data signal to the propagation path compensation unit 205 and the pilot signal to the propagation path estimation unit 207.

The propagation path compensation unit 205 performs propagation path compensation of data signal, using a propagation path information measured by the propagation path estimation unit 207. The demodulation unit 206 performs deinterleaving, error correction decoding, and other demodulation processing of data signal after propagation path compensation, and outputs received data of downlink-direction (a direction from the base station 100 to the mobile station 200).

The propagation path estimation unit 207 outputs an amplitude and phase for each pilot on the basis of the pilot signal.

The propagation path judgment unit 208 measures propagation path judgment information (propagation path change velocity and notch width, as well as SNR, bit error rate, and similar) for use in burst allocation on the basis of the amplitude and phase (hereafter called propagation path information H(t)) outputted from the propagation path estimation unit 207, and outputs the propagation path judgment information to the burst generation unit 209. Details are given below.

The burst generation unit 209 embeds the propagation path judgment information in received data of uplink direction, and generates burst. The modulation unit 210 performs interleaving, error correction encoding and other modulation processing of generated burst, and outputs data signals The mapping unit 212 maps pilot signal from the pilot generation unit 211 and data signal from the modulation unit 210 to N subcarrier signals. The IFFT unit 213 performs an inverse fast Fourier transform of the subcarrier signals, the GI addition unit 214 adds guard interval to the subcarrier signals after the inverse fast Fourier transform, and the transmission RF processing unit 215 performs prescribed RF processing and outputs baseband signal. The baseband signal is transmitted as uplink-direction transmission data from the mobile station 200 to the base station 100.

On the other hand, in the base station 100, the reception RF processing unit 108 inputs transmission data from the mobile station 200 via a reception antenna, and performs prescribed RF processing of the transmission data. The GI removal unit 109 removes guard interval from the received signal after RF processing, the FFT unit 110 performs a fast Fourier transform of the received signal after the removal of guard interval, and the demapping unit 111 separates data signal and pilot signal from the received signal after the fast Fourier transform (subcarrier signal).

The propagation path compensation unit 112 performs propagation path compensation of the data signal using a propagation path compensation information measured by the propagation path estimation unit 113. The demodulation unit 114 performs deinterleaving and other demodulation processing of data signal after propagation path compensation, and outputs reception data of uplink-direction. The demodulation unit 114 extracts propagation path judgment information embedded in the uplink received data, and outputs the information to the mapping control unit 115.

The mapping control unit 115 decides a burst allocation on the basis of the propagation path judgment information, and outputs a decided burst allocation information to the mapping unit 104. The burst allocation is described below.

The burst generation unit 101 generates burst for downlink transmission data, and the modulation unit 102 performs interleaving and other prescribed modulation and outputs data signal.

The mapping unit 104 maps data signal from the modulation unit 102 and pilot signal from the pilot signal generation unit 103 to each subcarrier according to the burst allocation information outputted from the mapping control unit 115.

The IFFT unit 105 performs an inverse fast Fourier transform of the mapped subcarrier signal, the GI addition unit 106 adds guard interval to the subcarrier signal after the inverse fast Fourier transform, and the transmission RF processing unit 107 performs prescribed RF processing and outputs baseband signal. The baseband signal is transmitted to the mobile station 200, via a transmission antenna, as downlink transmission data.

Next, the burst allocation (scheduling) method in the Embodiment 1 is explained. FIG. 3A to FIG. 3F depict an example of burst allocation. In the Embodiment 1, data (for each mobile station or for each user) is allocated in both the time axis direction and in the frequency axis direction.

Figure 3:
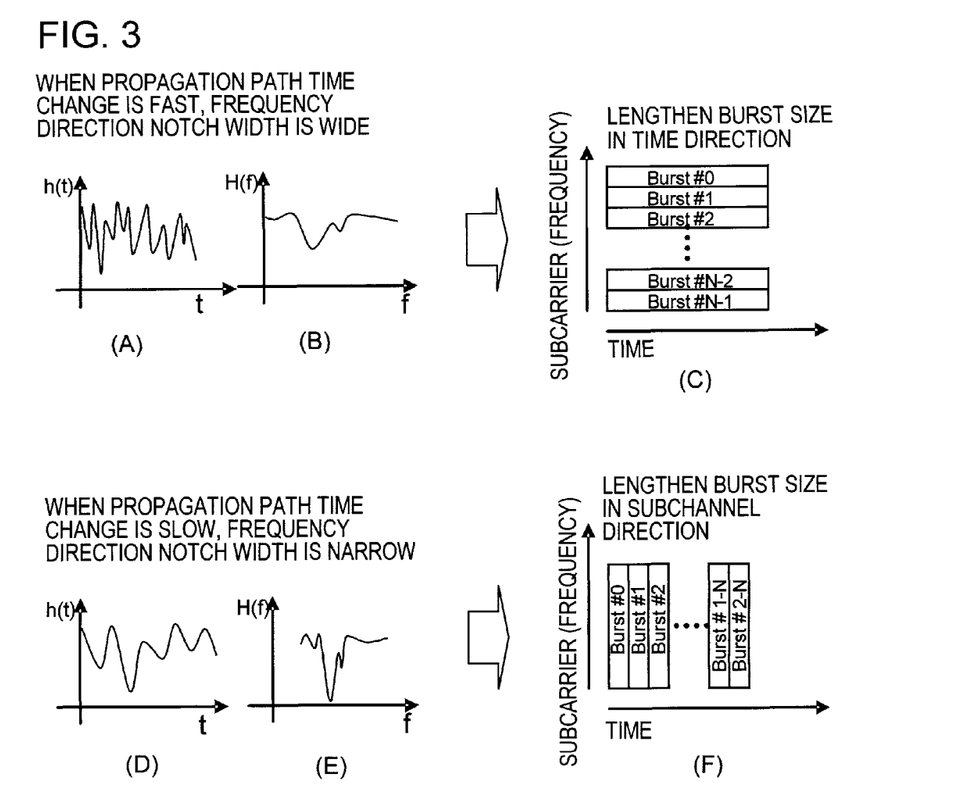
FIG. 3A and FIG. 3B depict examples of change in amplitude of received signals.
FIG. 3C depicts an example of burst allocation.
FIG. 3D and FIG. 3E depict examples of changes in amplitude of received signals.
FIG. 3F depicts an example of burst allocation.

As explained above, the propagation path judgment unit 208 of the mobile station 200 outputs the change velocity and notch width of the propagation path as propagation path judgment information using propagation path information H(t) from the propagation path estimation unit 207. FIG. 3A depicts an example of time changes of the propagation path, with the horizontal axis indicating time (t) and the vertical axis indicating amplitude (h(t)). And, FIG. 3B depicts an example of frequency changes of the propagation path, with the horizontal axis indicating frequency (f) and the vertical axis indicating amplitude (H(f)).

The propagation path judgment unit 208 inputs the phase and amplitude of each pilot outputted from the propagation path estimation unit 207, and by measuring the phase and amplitude at each prescribed time, figures such as those depicted in FIG. 3A and FIG. 3B can be obtained. The notch width is the width of the so-called decline width, and in the example of FIG. 3B, is the frequency width over which the amplitude continues at or below a prescribed amplitude value.

The propagation path judgment unit 208 outputs the measured propagation path change velocity and notch width to the burst generation unit 209. Detail of measurements is described below. The information (the propagation path judgment information) is transmitted together with data signal from the mobile station 200 to the base station 100.

The mapping control unit 115 of the base station 100 performs the burst allocation on the basis of the propagation path judgment information. That is, the mapping control unit 115 modifies the burst size so that the size is long in the time axis direction (see FIG. 3C), upon judging that time change in the propagation path is rapid and moreover that the frequency-direction notch width is wide. On the other hand, the mapping control unit 115 modifies the burst size so that the size is long in the frequency axis direction (see FIG. 3F), upon judging that time change in the propagation path is slow and moreover that the frequency-direction notch width is narrow (see FIG. 3D and FIG. 3E).

Modifications of the burst size may be modification of a basic burst size for which allocation is performed, or modification of the burst size for burst which at least partially overlaps (with partial overlap of transmission time and transmission subcarrier) a burst region allocated in previous transmission. When allocating (substantially) the same burst region for the same mobile station, the region may be modified in this manner.

As an example of burst region overlap, one data region allocated within a transmission frame prior to modification, which is a data region in which is stored data addressed to one or a plurality of mobile stations, and one data region allocated within a transmission frame after modification, which is a data region in which is stored data addressed to one or a plurality of mobile stations (which may be the same addresses as before modification, or different addresses), may include region which is common in time and frequency (subcarrier).

Of course, there is also case of overlap not of one data region, but of a plurality of data regions prior to modification and a plurality of data regions after modification.

Figure 4:
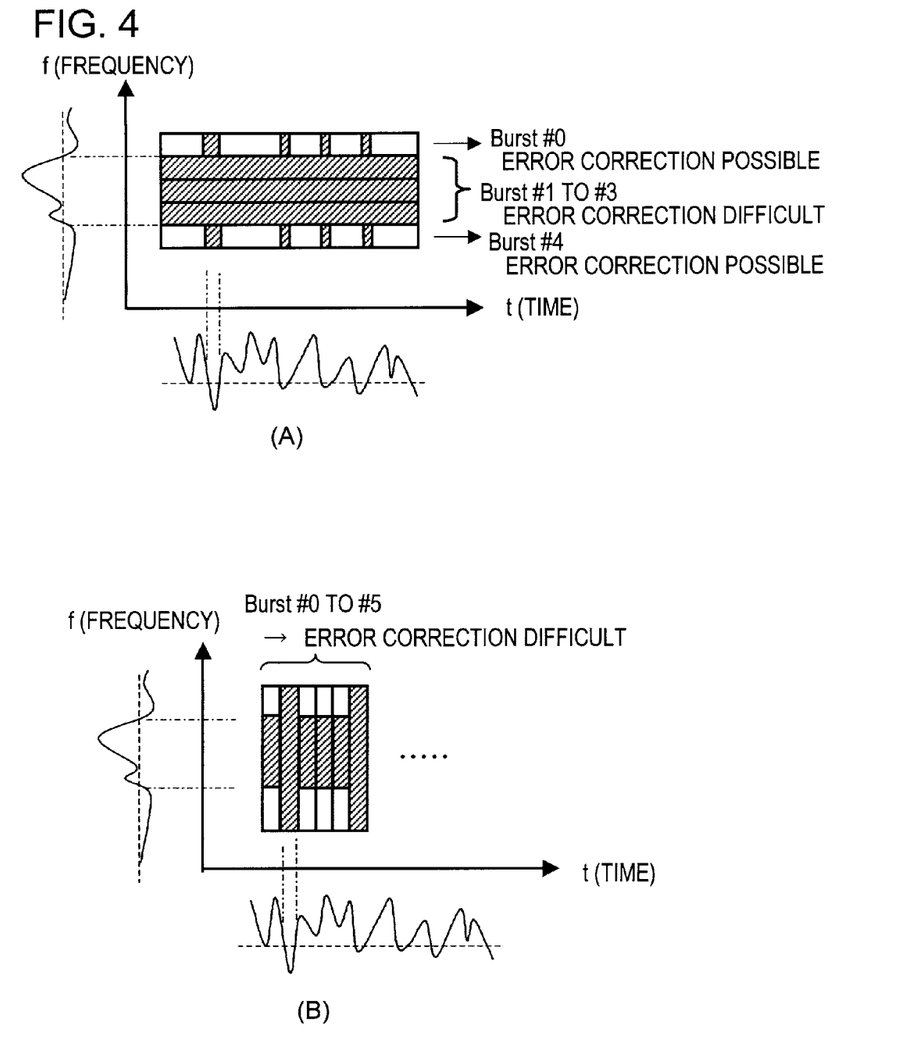
FIG. 4A and FIG. 4B depict examples of burst allocation.

Next, a reason for the modification of the burst size is explained. FIG. 4A and FIG. 4B depict an example of burst allocation when time change in the propagation path is rapid, and the notch width in the frequency direction is wide.

As depicted in FIG. 4A, in such a case if the burst size is made long in the time axis direction, then even when error correction is performed for three bursts (Burst #1 to #3) of the notch width, for which the frequency change is equal to or less than the threshold value, decoding is difficult; but the two bursts which are highest and lowest (Burst #0 and #4) can be error-corrected, although there is region equal to or less than the threshold value in the time axis direction.

On the other hand, if the burst size of the allocated burst is lengthened in the frequency axis direction, without changing the burst allocation position, then as depicted in FIG. 4B, each burst includes many regions of the notch width for which the frequency change is equal to or below the threshold value, so that even decoding is difficult if error correction is performed.

Figure 5:
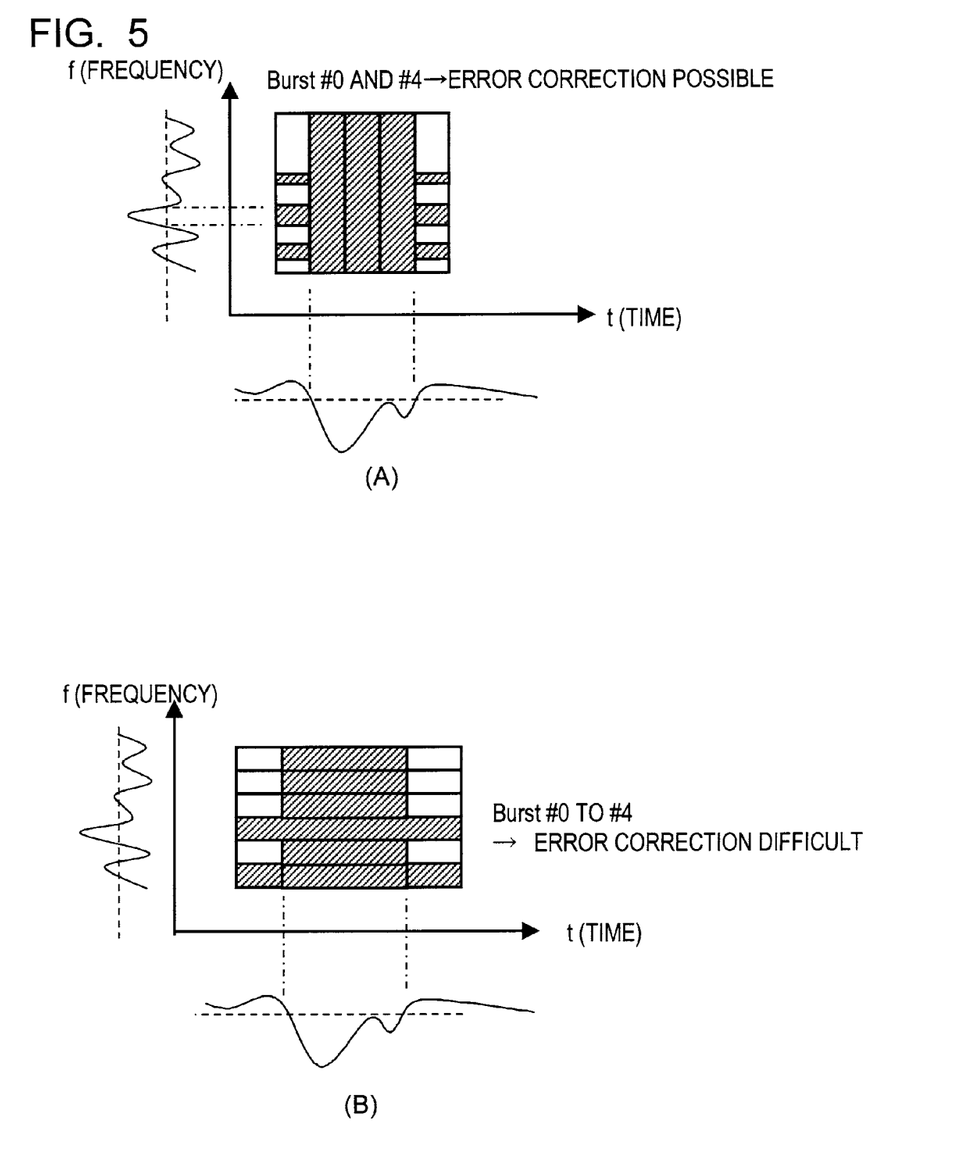
FIG. 5A and FIG. 5B depict examples of burst allocation.

FIG. 5A and FIG. 5B depict an example of burst allocation if, conversely, the time change of the propagation path is slow, and moreover the notch width in the frequency direction is narrow.

As depicted in FIG. 5A, in this case if the burst size is lengthened in the frequency axis direction, even if the error correction is performed for a number of bursts for which the time change is equal to or below the threshold value (Burst #1 to #3), decoding is difficult, but if the error correction is performed for bursts with time changes equal to or above the threshold value (Burst #0 and #4), decoding is possible.

On the other hand, if the size of a burst is lengthened in the time axis direction without changing the burst allocation position, each burst includes a region in which the time change is equal to or less than the threshold value, so that even if the error correction is performed, decoding is difficult.

That is, in the present embodiment, the change velocity in the time axis direction (the horizontal axis direction in FIG. 4A) and the change velocity in the frequency axis direction (the vertical axis direction in FIG. 4A) are compared, and if the change velocity in the time axis direction is greater than that in the frequency axis direction (FIG. 4A), the burst is modified so that the burst size is lengthened in the time axis direction, without changing the burst allocation position (or, the burst is modified so as to shorten the burst size in the frequency axis direction). On the other hand, if the change velocity in the frequency axis direction is greater than that in the time axis direction, the burst is modified so that the burst size in the frequency axis direction is lengthened without changing the burst allocation position (see FIG. 5A, or the burst is modified such that the burst size in the time axis direction is shortened).

If the propagation path state is poor, such as for example if the propagation path state is at or below a certain threshold, and if burst allocation is avoided in the frequency region and allocation is performed at a separate position, the frequency region is not used, and the throughput declines. In Embodiment 1, the burst allocation is performed even at position in frequency region and time region where the propagation path state is poor, and the size is modified such that correction by error correction is effective. Therefore, unused frequency region and time region are eliminated, and the throughput is improved.

In the present embodiment, the change velocity in the time axis direction is the time change in the propagation path, and the change velocity in the frequency axis direction is the notch width in the frequency direction. If the notch width in the frequency direction is wide, in general the change velocity in the frequency axis direction is slow, and if the width is narrow the change velocity is fast. That is, as depicted in FIG. 3A and elsewhere, "fast time change in the propagation path, and moreover a wide notch width in the frequency direction" indicates that the change velocity in the time axis direction is faster than the change velocity in the frequency axis direction; and as depicted in FIG. 3D and elsewhere, "slow time change in the propagation path, and a narrow notch width in the frequency direction" indicates that the change velocity in the frequency axis direction is faster than that in the time axis direction.

Figure 6:
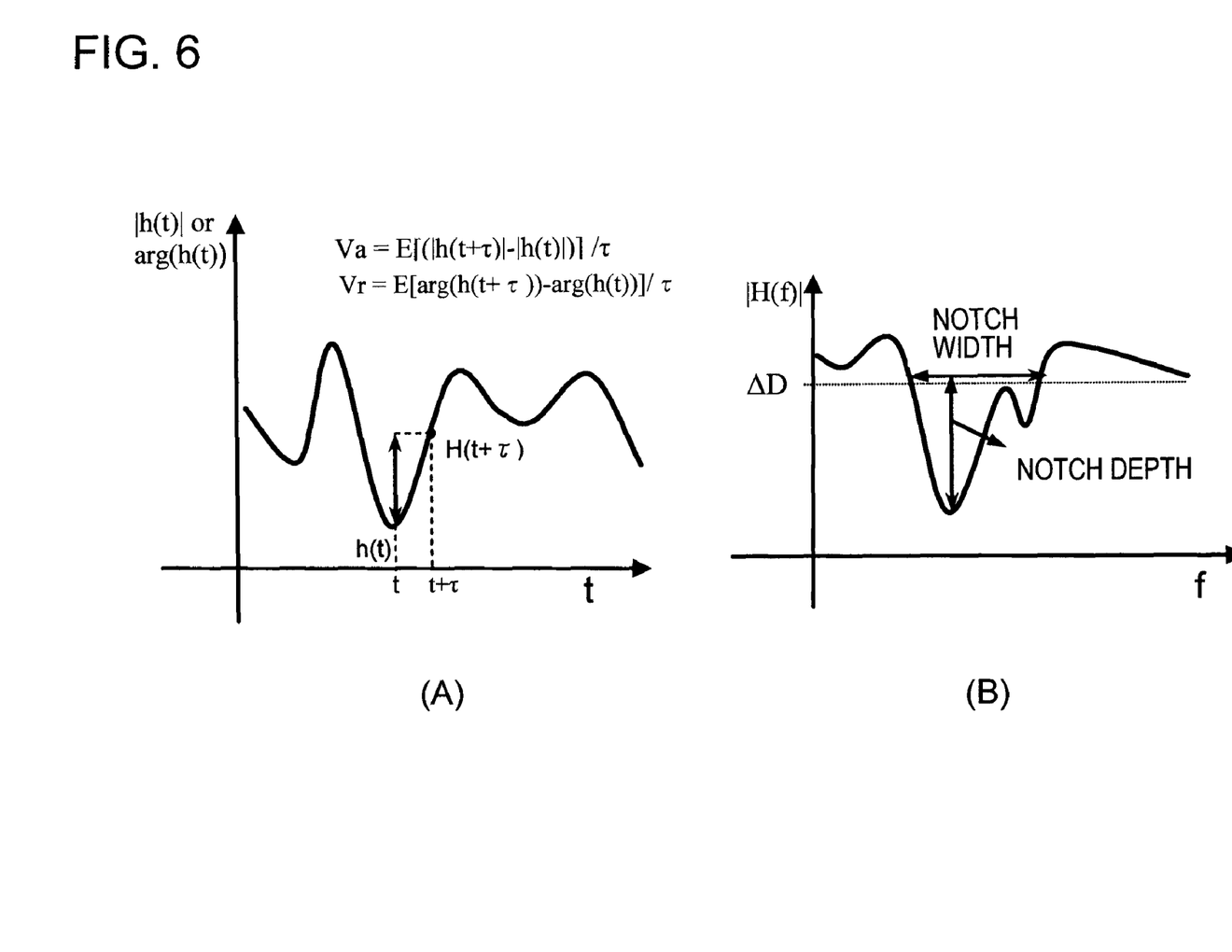
FIG. 6A depicts an example of change in amplitude or phase of received signals.
FIG. 6B depicts an example of change in amplitude of received signals.

Next, measurement of propagation path judgment information, performed by the propagation path estimation unit 208 of the mobile station 200, is explained in detail. FIG. 6A depicts changes in the time direction in the propagation path amplitude change value Va (rad/s) and the phase change value Vr (rad/s), FIG. 6B depicts changes in the frequency direction. FIG. 6A is a more detailed version of FIG. 3A explained above, and FIG. 6B is a more detailed version of FIG. 3B explained above.

The amplitude change value Va is a value which indicates the amount of change in amplitude of received signal (the change speed); the phase change value Vr is a value which indicates the change in phase of received signal (the change speed). The propagation path judgment unit 208 acquires propagation path information h(t) from the propagation path estimation unit 207. And the propagation path judgment unit 208 calculates the amplitude change value Va and movement change value Vr from the propagation path information h(t). Specifically, the following equations are used for calculation.

$$Va = E[(|h(t+\tau)| - |h(t)|)]/\tau \quad (1)$$

$$Vr = E[\arg(h(t+\tau)) - \arg(h(t))]/\tau \quad (2)$$

Here, E[ ] is the average for the set, and τ indicates the observation time period.

And, the propagation path judgment unit 208 calculates the change value V from the amplitude change value Va and the phase change value Vr. The following equation is used.

$$V = Va \times Cva + Vr \times Cvr \quad (3)$$

Here Cva and Cvr are weighting coefficients, which are coefficients employed when emphasizing either amplitude or phase, according to the propagation path state, when determining the change value. The propagation path judgment unit 208 outputs this change value V to the base station 100 as the propagation path change velocity (change velocity in the time axis direction).

The notch width is calculated as follows. The propagation path judgment unit 208 acquires the average amplitude value A(t) from the propagation path information H(t) obtained from the propagation path estimation unit 207. The average is taken in order to eliminate noise. The propagation path judgment unit 208 then obtains the threshold value ΔD(t) from the average amplitude value A(t). The following equation is used.

$$\Delta D(t) = A(t) + d \quad (4)$$

The propagation path judgment unit 208 uses equation (4) to compare the threshold value ΔD and the propagation path amplitude value |H(f)|, and detects notches falling below the threshold value ΔD (see FIG. 6B). And, the propagation path judgment unit 208 measures the width of each notch detected using the threshold value, takes the average value as the frequency direction notch width, and outputs the frequency direction notch width to the base station 100.

The propagation path change velocity and frequency direction notch width detected by the propagation path judgment unit 208 are output to the mapping control unit 115 of the base station 100, and the above-described judgment is performed.

Figure 7:
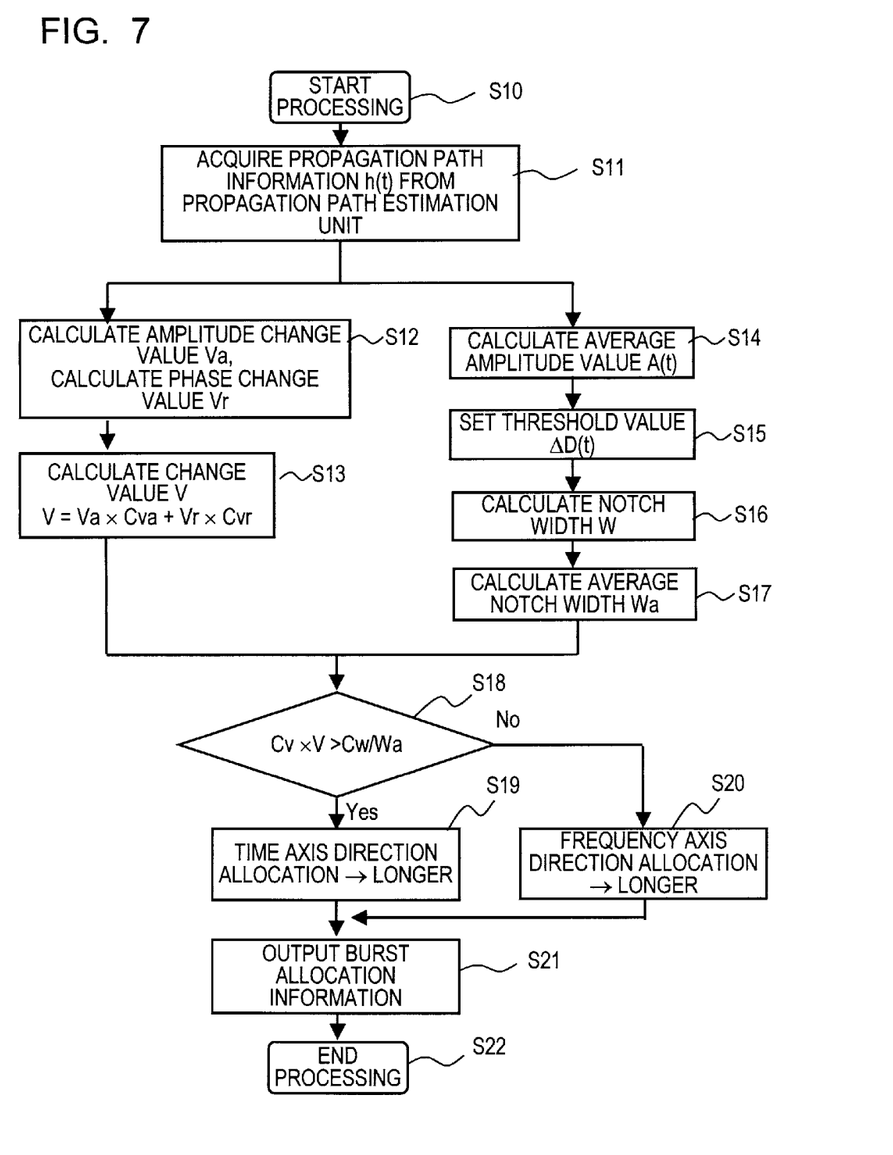
FIG. 7 is a flowchart depicting an example of processing.

FIG. 7 is a flowchart depicting an example of burst allocation processing performed by the propagation path judgment unit 208 of the mobile station 200 and the mapping control unit 115 of the base station 100. The flowchart summarizes the above explanation.

When processing is started, the propagation path judgment unit 208 acquires the propagation path information h(t) from the propagation path estimation unit 207 (S11). The propagation path judgment unit 208 uses the propagation path information h(t) to calculate the amplitude change value Va and phase change value Vr using equations (1) and (2) (S12), and uses equation (3) to calculate the change value V (S13).

The propagation path judgment unit 208 calculates the average amplitude value A(t) from the propagation path information h(t) (S14), and uses equation (4) to calculate the threshold value ΔD(t) (S15). And, the propagation path judgment unit 208 calculates the propagation path frequency direction notch width W from the threshold value ΔD(t) (S16), and calculates the average thereof. Wa (S17).

The calculated change value V and average notch width Wa are output to the mapping control unit 115.

The mapping control unit 115 judges which of the time direction change velocity and the frequency direction change velocity is greater, based on the change value V and the average notch width Wa (S18). That is, the mapping control unit 115 uses the following equation for judgment.

$$Cv \times V > Cw/Wa \quad (5)$$

Here Cv and Cw are weighting coefficients; in the frequency direction, the reciprocal of the notch width Wa indicates the change velocity in the frequency direction. Equation (5) indicates that the time direction change velocity is greater than that in the frequency direction.

Hence if equation (5) is satisfied, the change velocity in the time axis direction is greater than the change velocity in the frequency axis direction, and so the mapping control unit 115 changes the burst size so as to lengthen the burst size in the time axis direction without modifying the burst position (S19).

On the other hand, if equation (5) is not satisfied, the change velocity in the frequency axis direction is greater than in the time axis direction, and so the mapping control unit 115 modifies the burst size so as to length the burst size in the frequency axis direction without modifying the burst position (S20).

These modification information are output as burst allocation information from the mapping control unit 115 to the mapping unit 104, and the mapping unit 104 performs mapping to each subcarrier according to the burst allocation information.

In Embodiment 1, the propagation path information is acquired from received signal received by the mobile station 200, the propagation path judgment information (the time change and frequency direction notch width of the propagation path) is transmitted to the base station 100, and the burst size is modified. In a FDD (Frequency Division Duplex) system, the mobile station 200 measures the downlink direction propagation path state and transmits the measurement results to the base station in this way, and on the base station side, scheduling is performed. The present embodiment 1 is an example which assumes such the FDD system.

In the above-described example, the case is explained in which propagation path judgment information is transmitted to the base station 100; other than this, the propagation path information H(t) can be transmitted without modification from the mobile station 200 to the base station 100, and the change velocity and notch width of the propagation path can be calculated at the base station. Or, processing up to burst size modification can be performed at the mobile station 200 (S19, S20), and the modified information can be transmitted to the base station 100 to perform mapping. In either case, similarly to the above-described example, there is the advantageous result that throughput and communication quality are improved.

Further, in the above-described example the case is explained in which the wireless communication system is the OFDM or OFDMA system. Of course, the present embodiment 1 can be implemented in any wireless communication system in which scheduling is performed in both the frequency axis direction and the time axis direction, and similar advantageous results can be obtained.

Further, in the above-described example, the case is explained in which the time change and notch width of the propagation path are used as propagation path judgment information. Of course, in addition to these the SNR (Signal-to-Noise Ratio), bit error rate, and other communication quality information may be used. For example, these information may be obtained by the demodulation unit 206 and propagation path judgment unit 208 of the mobile station 200 and transmitted to the base station 100.

Further, in the above-described example, the case is explained in which the local station 100 is the base station and the remote station 200 is the mobile station. Of course, the above-described example is exactly the same when the local station 100 is the mobile station and the remote station 200 is the base station, and similar advantageous results are obtained. In this case, the uplink direction and downlink direction are the opposite of those in the above example, and so data allocation is performed in the opposite direction. However, in the present Embodiment 1 the FDD system is assumed, so that propagation path judgment information is measured at the base station 200, and this information is fed back to the mobile station 100 so that the burst size is modified at the mobile station 100.

Embodiment 2

Next, Embodiment 2 is explained. In Embodiment 1, the case is explained which assumed the FDD system. Embodiment 2 is an example which assumes a case in which the symmetry of the propagation path uplink direction and downlink direction, as in a TDD (Time Division Duplex) system, is utilized to perform data mapping (scheduling) in the downlink direction based on the uplink direction propagation path state.

Figure 8:
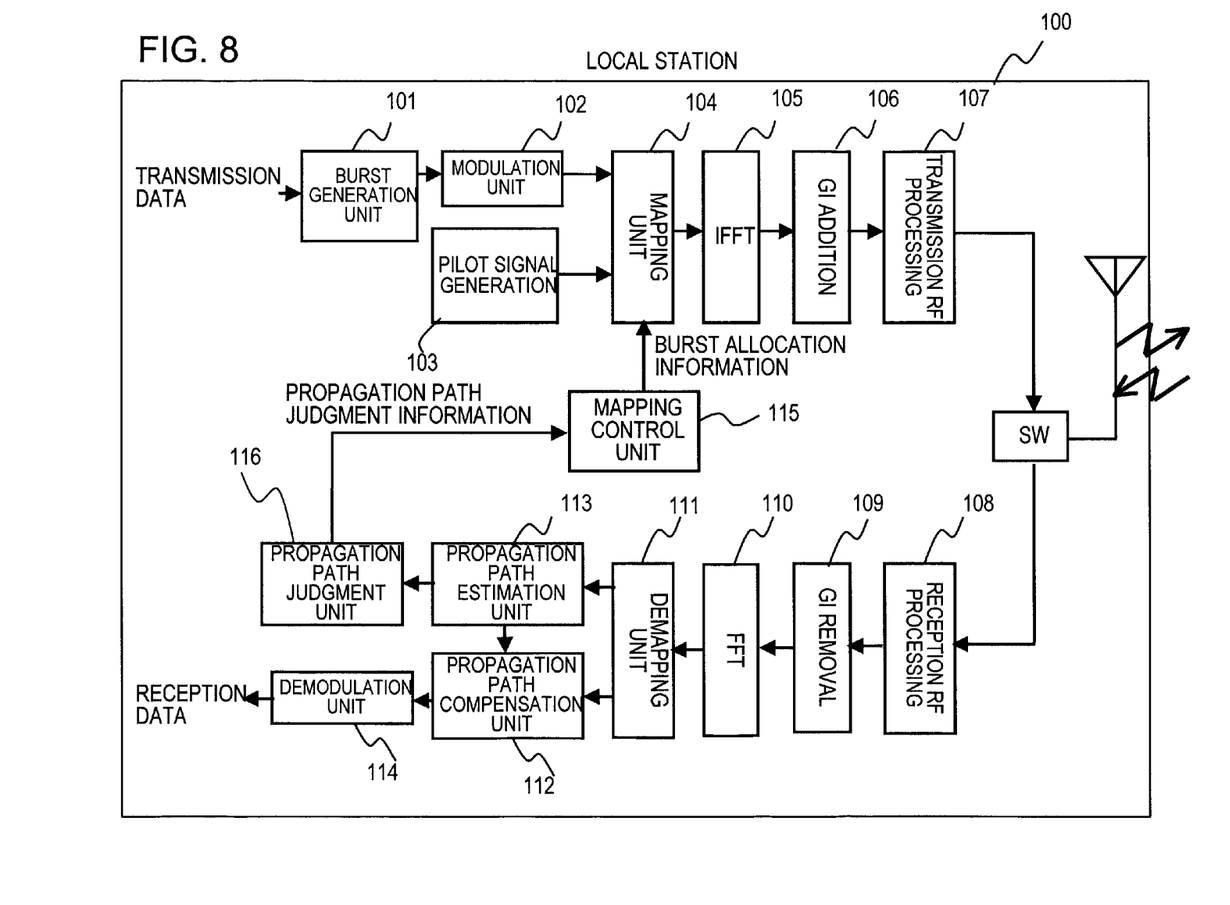
FIG. 8 depicts another example of the configuration of a local station.

FIG. 8 depicts an example of the configuration of the local station 100 in Embodiment 2. The same unit in the local station 100 of Embodiment 1 (see FIG. 1) is assigned the same symbol. The following explanation assumes that the local station 100 is the base station.

The base station 100 further includes a propagation path judgment unit 116. The propagation path judgment unit 116 performs processing similar to the propagation path judgment unit 208 in Embodiment 1, on the basis of the propagation path information H(t) from the propagation path estimation unit 113. That is, the propagation path judgment unit 116 measures the time change and frequency direction notch width of the propagation path through processing similar to that in Embodiment 1, and outputs the results, as propagation path judgment information, to the mapping control unit 115. The processing of the mapping control unit 115 is similar to that in Embodiment 1.

In the present Embodiment 2, processing to measure the time change and frequency direction notch width of the propagation path is performed by the base station 100, so that the propagation path information and propagation path judgment information does not transmit from the mobile station 200 to the base station 100. In this respect, compared with Embodiment 1, throughput can be improved to the extent that these information are not transmitted. Of course, in Embodiment 2 advantageous results which are entirely similar to those of Embodiment 1 can be obtained. Further, other examples explained in Embodiment 1 can also be similarly implemented in Embodiment 2, with similar advantageous results accruing.

By means of the present embodiments, the data allocation method in the wireless communication system in which declines in throughput is suppressed, and such the wireless communication system, can be provided. Further, by means of the present embodiments, the data allocation method and similar which secures communication quality can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A data allocation method in a wireless communication system in which data is allocated in both a time axis direction and frequency axis direction, and data is transmitted between a mobile station and base station according to an allocated schedule, the allocation method comprising:

measuring propagation path information of a propagation path between the mobile station and the base station; and modifying an allocation width of a burst in the time axis direction or in the frequency axis direction based on the propagation path information, wherein the propagation path information includes a change velocity of the propagation path and a notch width in the propagation path.

2. The data allocation method according to claim 1, wherein the propagation path information includes an information of the change velocity of the propagation path, and the notch width indicating a width of a decline in the frequency direction in the propagation path.

3. The data allocation method according to claim 2, wherein in the modifying step, the allocation width of the burst is modified to be longer in the time axis direction than the allocated burst, if the change velocity of the propagation path is slow compared with a threshold value, and the allocation width of the burst is modified to be narrower in the time axis direction than the allocated burst, if the change velocity of the propagation path is fast compared with the threshold value.

4. The data allocation method according to claim 1, wherein in the modifying step the allocation width of the burst is modified to be wider in the time axis direction, if the change velocity of the propagation path is fast and the notch width is wide.

5. The data allocation method according to claim 1, wherein in the modifying step the allocation width of the burst is modified to be wider in the frequency axis direction, if the change velocity of the propagation path is slow and the notch width is narrow.

6. The data allocation method according to claim 1, wherein the propagation path information includes a bit error rate for received data or a signal-to-noise ratio for received data.

7. The data allocation method according to claim 1, wherein in the measurement step, the propagation path information is measured in the mobile station or in the base station, and the measured propagation path information is transmitted to the base station or to the mobile station respectively, and in the allocation step, the allocation width of the burst is modified in the base station or in the mobile station respectively.

8. The data allocation method according to claim 1, wherein in the measurement step the propagation path information is measured in the mobile station or in the base station, and the mobile station or the base station modifies the allocation width of the burst in the modifying step, without transmitting the propagation path information to the base station or the mobile station respectively.

9. The data allocation method according to claim 1, wherein in the modifying step, the change velocity in the time axis direction of the propagation path is compared with the change velocity in the frequency axis direction of the propagation path based on the propagation path information, and if the change velocity in the time axis direction is greater than the change velocity in the frequency axis direction, the allocation width of the burst is modified to be longer in the time axis direction than the allocated burst, and if the change velocity in the frequency axis direction is greater than the change velocity in the time axis direction, the allocation width of the burst is modified to be longer in the frequency axis direction than the allocated burst.

10. The data allocation method according to claim 1, wherein in the modifying step, the allocation width of the burst is modified to be wider in the frequency axis direction, if the notch width is narrow compared with a threshold value, and the allocation width of the burst is modified to be wider in the frequency axis direction, if the notch width is wide compared with the threshold value.

11. A wireless communication system, comprising:
a mobile station; and
a base station, wherein
data is allocated in both a time axis direction and frequency axis direction, and data is transmitted between the mobile station and base station according to an allocated schedule;
the mobile station or the base station includes a propagation path measurement unit which measures propagation path information of a propagation path between the mobile station and base station, and a transmission unit which transmits the propagation path information to the base station or to the mobile station respectively;
the base station or the mobile station includes a mapping control unit which modifies an allocation width of a burst in the time axis direction or the frequency axis direction on the basis of the propagation path information, and
the propagation path information includes a change velocity of the propagation path and a notch width in the propagation path.

12. A wireless communication system, comprising:
a mobile station; and
a base station, wherein
data is allocated in both a time axis direction and a frequency axis direction, and data is transmitted between the mobile station and base station according to an allocated schedule;
the mobile station or the base station includes a propagation path measurement unit which measures propagation path information of a propagation path between the mobile station and base station, and a mapping control unit which modifies an allocation width of a burst in the time axis direction or the frequency axis direction based on the propagation path information, and
the propagation path information includes a change velocity of the propagation path and a notch width in the propagation path.

* * * * *